(12) United States Patent
Chlopek et al.

(10) Patent No.: US 10,870,743 B2
(45) Date of Patent: *Dec. 22, 2020

(54) COATED PIGMENTS FOR COLORING PVC

(71) Applicant: LANXESS Deutschland GmbH, Cologne (DE)

(72) Inventors: Krzysztof Chlopek, Krefeld (DE); Ulrich Meisen, Kall (DE); Ralf Gerhard Koenig, Duesseldorf (DE)

(73) Assignee: LANXESS Deutschland GmbH, Cologne (DE)

( * ) Notice: Subject to any disclaimer, the term of this patent is extended or adjusted under 35 U.S.C. 154(b) by 630 days.

This patent is subject to a terminal disclaimer.

(21) Appl. No.: 14/648,464

(22) PCT Filed: Dec. 13, 2013

(86) PCT No.: PCT/EP2013/076585
§ 371 (c)(1),
(2) Date: May 29, 2015

(87) PCT Pub. No.: WO2014/091008
PCT Pub. Date: Jun. 19, 2014

(65) Prior Publication Data
US 2015/0299430 A1    Oct. 22, 2015

(30) Foreign Application Priority Data
Dec. 13, 2012 (EP) .................................. 12197078

(51) Int. Cl.
| C08K 9/02 | (2006.01) |
| C09C 1/22 | (2006.01) |
| C09C 1/24 | (2006.01) |
| C08K 5/07 | (2006.01) |

(52) U.S. Cl.
CPC .................. *C08K 9/02* (2013.01); *C08K 5/07* (2013.01); *C09C 1/22* (2013.01); *C09C 1/24* (2013.01); *C01P 2004/84* (2013.01); *C01P 2006/12* (2013.01)

(58) Field of Classification Search
CPC .... C08K 9/02; C08K 5/07; C09C 1/24; C09C 1/22; C01P 2004/84; C01P 2006/12
USPC ........................................................ 427/218
See application file for complete search history.

(56) References Cited

U.S. PATENT DOCUMENTS

| 4,375,373 A | 3/1983 | Abe et al. |
| 4,734,136 A | 3/1988 | Burow |
| 5,059,250 A | 10/1991 | Burow et al. |
| 5,296,168 A * | 3/1994 | Jacobson .................. C09C 1/00 106/441 |
| 5,770,310 A * | 6/1998 | Noguchi .................. A61K 8/19 106/436 |
| 8,016,935 B2 | 9/2011 | Morency et al. |
| 2006/0246149 A1* | 11/2006 | Buchholz ............. A61K 8/0241 424/603 |
| 2007/0183998 A1* | 8/2007 | Suzuki ..................... A61K 8/19 424/63 |
| 2008/0181921 A1* | 7/2008 | DeLuca ................ C09C 1/0024 424/401 |
| 2012/0263767 A1* | 10/2012 | Oudry ...................... A61Q 1/06 424/401 |
| 2014/0209829 A1* | 7/2014 | Farrand ................. C09B 67/009 252/62.2 |
| 2014/0314463 A1* | 10/2014 | Tranchant ................ A61Q 1/10 401/1 |
| 2015/0290090 A1* | 10/2015 | Matsufuji ................ A61K 8/29 424/401 |

FOREIGN PATENT DOCUMENTS

| CN | 101407615 A | 4/2009 | |
| EP | 0262503 A2 * | 4/1988 | ............... C09C 1/24 |
| JP | 53136038 A | 11/1998 | |
| JP | 2009215384 A | 9/2009 | |

OTHER PUBLICATIONS

Machine translation of EP 0262503 A2, Aug. 2017.*
S.S. Lele, J. Vinyl Tech. 1984, vol. 6, No. 2, p. 77 to 81.
P. Carty et al., Polymer 1992, vol. 33, No. 13, p. 2704-2708.
Australian Patent Examination Report No. 2, dated Apr. 1, 2016, 5 pages.
Colombian Search Report, Oficio No. 9000, received Sep. 21, 2016, 15 pages.
European Search Report from European Application No. 12197078, dated May 15, 2013, two pages.

* cited by examiner

*Primary Examiner* — Lynda Salvatore

(74) *Attorney, Agent, or Firm* — Nicanor A. Kohncke; Christopher L. McDavid

(57) ABSTRACT

Coated pigments for plastics, as well as processes for production of the pigments, the use thereof for colouring polyvinyl chloride (PVC), processes for colouring PVC, PVC coloured with such coated pigments, and also plastics products including such coated pigments, may include inorganic pigments coated with of at least one of hydroxides of magnesium, hydroxides of calcium, oxides of magnesium, and oxides of calcium.

28 Claims, No Drawings

COATED PIGMENTS FOR COLORING PVC

The present invention relates to coated pigments comprising at least one inorganic pigment from the group of the iron oxides, iron oxide hydroxides, zinc ferrites, magnesium ferrites and manganese ferrites, provided with a coating comprising hydroxides and/or oxides of magnesium and/or calcium, to processes for production thereof, to the use thereof for colouring polyvinyl chloride (PVC), and also to processes for colouring PVC and to PVC coloured with such coated pigments, and also to plastics products comprising such coated pigments.

BACKGROUND

PVC is used predominantly as a raw material, for example, for window profiles, pipes, floor coverings and roofing membranes in the construction sector. Rigid and flexible films are likewise produced from PVC. PVC is often also used as insulation material for electrical cables, and for electrical switch boxes and feeding tubes for cables, cable ducts or cable covers.

PVC forms part of the group of the amorphous thermoplastic polymers. The plastic is typically hard and brittle and is usually adapted for the different applications by the addition of plasticizers and stabilizers.

PVC is typically used with different contents of plasticizers. PVC having a content of plasticizers of 0% to 12% is also called rigid PVC. PVC having a content of plasticizers of more than 12% is also called flexible PVC (Römpp Chemielexikon, Online Version 3.28, article last updated; December 2009, document identifier: RD-16-03650). In general, plasticizer contents are reported in percent by weight.

PVC is frequently coloured with organic and inorganic pigments. Organic pigments used are, for example, isoindoles, naphthol AS, copper phthalocyanine pigments or monoazo calcium salts. From the group of the inorganic pigments, mixed phase metal oxide pigments are frequently used, such as nickel mile pigments, chromium rutile pigments, iron chromites, inverse cobalt or copper spinels or iron cobalt chromite spinels. These pigments are very weathering- and light-stable, but have the drawback of being many times more expensive than other iron-containing inorganic pigments.

Also known is the colouring of PVC with inorganic pigments such as iron oxides or iron oxide hydroxides, zinc ferrites, magnesium ferrites or manganese ferrites. Iron oxides and iron oxide hydroxides are found to be particularly light-fast pigments having a constant colour over a long period even under a wide variety of different weathering conditions. However, when PVC is coloured with iron oxides or iron oxide hydroxides or zinc ferrites, magnesium ferrites or manganese ferrites according to the prior art, homogeneous or inhomogeneous discolouration of the product occurs both on processing at the requisite high temperatures and on exposure of the shaped plastic to light, UV light or heat. This undesirable phenomenon is much more serious in the case of rigid PVC, since products made from rigid PVC are frequently used outdoors, where weathering-related influences are of course more intense. In the case of products made from flexible PVC which are used predominantly indoors, such instances of discolouration occur occasionally, for example shortly after processing. These adverse effects have already long been known and are described, for example, in S. S. Lele, J. Vinyl Tech, 1984, Vol. 6, No. 2, p. 77 to 81 or P. Carty et al., Polymer 1992, Vol. 33, No. 13, p. 2704-2708.

DE 3539306 A1 describes heat-resistant yellow pigments which have been coated with aluminium phosphate hydroxides of the general formula $[AlO]_x PO_4 [OH]_{x-3}$ for colouring of thermoplastics. However, in-house studies have shown that PVC coloured with these coated pigments does not have sufficiently higher thermal stability than the PVC coloured with the uncoated pigment. In-house studies have also shown that PVC coloured by iron oxides coated with other inorganic aluminium compounds, e.g. aluminium oxide or aluminium hydroxide, or magnesium phosphate, likewise does not have higher thermal stability than PVC coloured by uncoated iron oxides. Therefore, the problem addressed by the present invention was that of providing inorganic pigments from the group of iron oxides, iron oxide hydroxides, zinc ferrites, magnesium ferrites and/or manganese ferrites, which do not lead to unwanted homogeneous or inhomogeneous discolouration of the PVC coloured therewith, either in the form of plastics products or of products produced therefrom.

SUMMARY

It has now been found that, surprisingly, this problem is solved by coated pigments comprising at least one inorganic pigment from the group of iron oxides, iron oxide hydroxides, zinc ferrites, magnesium ferrites and/or manganese ferrites, wherein the at least one inorganic pigment has been provided with a coating comprising hydroxides and/or oxides of magnesium and/or calcium, and the above-described drawbacks of the prior art pigments are overcome.

DETAILED DESCRIPTION

Iron oxides present in the coated pigments according to the invention are, for example, haematite (iron oxide red, $\alpha$-$Fe_2O_3$), maghemite (brown iron oxide $\gamma$-$Fe_2O_3$) or magnetite (iron oxide black, $Fe_3O_4$), preferably haematite (iron oxide red, $\alpha$-$Fe_2O_3$).

From the group of the iron oxide hydroxides, the coated pigments according to the invention comprise, for example, goethite (iron oxide yellow, $\alpha$-FeOOH) or lepidocrocite ($\gamma$-FeOOH).

Zinc ferrites, magnesium ferrites and/or manganese ferrites form part of the group of the mixed phase pigments of the general formula $M_x Fe_{3-x} O_4$ where M is Zn, Mg or Mn, and x comprises values greater than 0 and less than or equal to 1. The coated pigment according to the invention may also contain one or more different mixed phase pigments from those mentioned above. Preferably, the coated pigment according to the invention contains only one inorganic pigment.

The coated pigments according to the invention have been coated with hydroxides and/or oxides of magnesium and/or calcium. In the context of the present invention, the term "coated" means that the surface of a core of the inorganic pigment is bonded directly to a surrounding layer of the hydroxides and/or oxides of magnesium and/or calcium. The coating can be detected, for example, via electron micrographs of the pigments.

The coated pigments according to the invention, as well as the first coating of hydroxides and/or oxides of magnesium and/or calcium, may or may not have been provided with at least one further coating, either an organic coating, preferably an organic coating composed of oils and/or waxes and/or fatty acid salts, or an inorganic coating. Preferably, the coated pigments according to the invention have not been provided with any organic coating. This means that the coated pigments according to this invention have preferably been coated exclusively with an inorganic coating comprising hydroxides and/or oxides of magnesium and/or calcium.

Oils in the context of the invention are understood to mean nonpolar or slightly polar, nonvolatile substances that are liquid at room temperature. Preference is given to oils having a kinematic viscosity of 1.6 to 1500 ram % at 40° C. (measured to DIN 51562). Additionally preferred in the compositions according to the invention are the oils from the group of synthetic oils consisting essentially of the elements carbon and hydrogen and/or nitrogen and/or oxygen and/or sulphur and/or halogens (preferably fluorine, chlorine, bromine and/or iodine) and/or boron, mineral oils, and animal and/or vegetable oils. More preferably present in the compositions according to the invention are synthetic hydrocarbon-based oils or mineral oils (obtained from crude oils or coal).

Waxes may be selected from the group of Fischer-Tropsch waxes, mineral waxes, montan waxes, vegetable waxes and/or animal waxes. Fischer-Tropsch waxes are synthetic aliphatic hydrocarbons, i.e. synthetic paraffin waxes having high molecular mass and a chain length of 20 to 120 carbon atoms. The group of the Fischer-Tropsch waxes also includes oxidized Fischer-Tropsch waxes. Fischer-Tropsch waxes generally have a solidification point of greater than 70° C. They are relatively hard, which can be measured via needle penetration at 25° C. in the unit "mm". For the measurement of needle penetration at different temperatures, for example 25° C. or 65° C., there exist, for example, the methods according to ASTM D 1321 or DIN 51579. For these waxes, typical needle penetration values at 25° C. are in the range from 0.1 mm to 1 mm. Fischer-Tropsch waxes are produced via what is called the Fischer-Tropsch method from synthesis gas (hydrogen, carbon monoxide) from coal gasification or from natural gas in the presence of catalysts. Mineral waxes are mixtures of normal, branched-chain and cyclic saturated hydrocarbons which are obtained by refining of waxes of fossil origin, for example ceresin. The group of the mineral waxes also includes the microcrystalline hard waxes. Montan waxes are natural waxes extractable from brown coal types. These have formed from resins, waxes and fats from tertiary plants. Vegetable waxes are, for example, sugarcane wax or carnauba wax. The animal waxes include spermaceti, wool wax and beeswax. The waxes may be in their original, i.e. chemically unmodified, forms or in chemically modified forms thereof.

Fatty acid salts, also called metal soaps, are preferably selected from the group of the zinc, calcium, magnesium and/or barium salts of lauric acid (dodecanoic acid), myristic acid (tetradecanoic acid) and/or stearic acid (octadecanoic acid), more preferably from magnesium stearate, zinc stearate and/or calcium stearate.

In the coated pigment according to the invention, the pigment present from the group of the iron oxides is preferably haematite, and this coated pigment preferably has an isoelectric point of <7, more preferably of <6.8. In a further preferred embodiment, the pigment present in the coated pigment is selected from the group of the iron oxides, iron oxide hydroxides, zinc ferrites, magnesium ferrites and/or manganese ferrites, excluding haematite, wherein the coated pigment preferably has an isoelectric point of 2 to 12. The isoelectric point (IEP), which is also called zeta potential, is measured to ISO 13099-2.

The isoelectric point for the coated iron oxide hydroxides is typically from 3 to 11. The lower limit in the IEP for the coated pigments according to the invention is typically 2.

The coated pigments according to the invention comprise preferably from 0.3% to 30% by weight, more preferably from 0.5% to 25% by weight, most preferably from 0.5% to 20% by weight, of magnesium and/or calcium, based on the total weight of the coated pigment. The magnesium or calcium content of the coated pigment is determined as the content of the element in question, unless stated otherwise, via optical emission spectrometry after excitation in an inductively coupled plasma (ICP-OES). For this purpose, the magnesium or calcium content of the entire coated pigment is determined. The percentages by weight indicate the total proportion as a sum of the contents of magnesium and calcium.

In a further preferred embodiment, the coated pigment comprises from 3.1% to 30% by weight, preferably from 3.5% to 25% by weight, of magnesium, or from 5.0% to 30% by weight, preferably from 5.5% to 25% by weight, of calcium, based on the total weight of the coated pigment.

In a further preferred embodiment, the pigments are coated exclusively with hydroxides and/or oxides of magnesium. The uncoated pigments used typically contain traces of calcium salts. Therefore, the pigments coated with hydroxides and/or oxides of magnesium in this preferred embodiment typically comprise from 0.3% to 30% by weight, more preferably from 0.5% to 25% by weight and most preferably from 0.5% to 20% by weight of magnesium, and 0.001% to 0.1% by weight of calcium.

The coated pigments according to the invention preferably have DIN pH values to EN ISO 787-9 of 8 to 12, more preferably of 8.5 to 12, most preferably of 9 to 12. In addition, the coated pigments according to the invention preferably have specific BET surface areas, measured to DIN ISO 9277, of 7 to 150 m$^2$/g, preferably of 12 to 90 m$^2$/g.

In a further preferred embodiment, the coated pigments consist of at least one inorganic pigment from the group of iron oxides, iron oxide hydroxides, zinc ferrites, magnesium ferrites and/or manganese ferrites, wherein the at least one inorganic pigment has been provided with a coating comprising hydroxides and/or oxides of magnesium and/or calcium, more preferably comprising hydroxides of magnesium and/or calcium.

In a further preferred embodiment, the coated pigment comprises at least one inorganic pigment from the group of iron oxides, iron oxide hydroxides, zinc ferrites, magnesium ferrites and/or manganese ferrites, wherein the at least one inorganic pigment has been provided with a coating comprising hydroxides and/or oxides of magnesium and/or calcium, wherein the surface of a core of the inorganic pigment has been bonded directly to a surrounding layer of the hydroxides and/or oxides of magnesium and/or calcium.

The invention encompasses any conceivable combination of different process and physical parameters defined and the preferred ranges thereof.

It has now been found that, surprisingly, PVC coloured with the pigments coated in accordance with the invention has a higher thermal stability than PVC coloured with the corresponding uncoated pigments. The elevated thermal stability of the PVC coloured with the pigment coated in accordance with the invention firstly can be shown by means of a thermal treatment with a kneader if the torque on the kneader and the temperature of the kneaded product is recorded as a function of time and compared for various samples. In the course of breakdown of the PVC, degradation of the polymer occurs, which leads to a decrease in the viscosity and hence to a reduction in the torque on the kneader.

In addition, the elevated thermal stability of the PVC coloured with the coated pigment according to the invention can be measured by the testing of specimens in a Mathis oven.

The details of the test methods and the evaluation thereof can be found in the "Examples and Methods" section.

The present invention also relates to the use of the coated pigment according to the invention for colouring PVC, preferably rigid PVC.

The present invention also relates to a method for colouring PVC, preferably rigid PVC, with the coated pigment according to the invention. The colouring can be effected by customary methods, for example by mixing, kneading or extruding uncoloured PVC with the coated pigment in the melt or by melting PVC dry-blends comprising the coated pigment according to the invention.

The present invention also relates to plastics products, for which the terms masterbatch, compounds or coloured end product are used synonymously, comprising at least one coated pigment according to the invention, and additionally comprising PVC, preferably rigid PVC. Preferred plastics products are those comprising coloured PVC. Alternatively preferred plastics products are those comprising at least one coated pigment according to the invention and at least one polymer, wherein the at least one polymer is a PVC homopolymer, i.e. a polymer formed exclusively from the monomer vinyl chloride. Further alternatively preferred plastics products are those including at least one polymer as plastic, in which case the polymer is preferably formed at least to an extent of 50% by weight, more preferably at least to an extent of 80% by weight, from the monomer vinyl chloride. This is the case firstly if the plastic is a PVC copolymer formed not only from vinyl chloride but also from other monomers, for example vinyl acetate or butyl acrylate. In that case, the copolymer has preferably been formed at least to an extent of 50% by weight, more preferably at least to an extent of 80% by weight, from the monomer vinyl chloride. This is the case secondly if the plastic comprises mixtures or blends of various polymers, one of the polymers being a PVC homopolymer or a PVC copolymer. In that case, the mixture or blend has preferably been formed at least to an extent of 50% by weight, more preferably at least to an extent of 80% by weight, from the monomer vinyl chloride. Coloured PVC in the context of the invention is understood to mean a PVC in which the coated pigment according to the invention has been incorporated into the polymer matrix of the polyvinyl chloride.

Compounds further comprise, for example, processing aids, reinforcers, fillers, dyes, further pigments and other organic and inorganic additives, and thus enable the production of a wide variety of different mouldings, for example through extrusion, injection moulding, calendering or blow-moulding. The mouldings generally correspond to the end products, called products in the context of this invention, for example window frames, pipes, insulation material, films or bottles. The PVC is coloured by adding masterbatches or adding the pigment directly to the compounds.

The plastics product according to the invention comprises, according to the end use, different amounts of coated pigment according to the invention.

Masterbatches are typically used in the form of "colour concentrates" for colouring of PVC or other plastics products. Therefore, these masterbatches have a relatively high pigment content of greater than 10% to 90% by weight, more preferably of 20% to 70% by weight, of coated pigment according to the invention.

If the plastics product is already in its form envisaged for final use as a compound having the desired colour, the contents of coated pigment according to the invention are preferably from 0.1% to 10% by weight, more preferably 0.5% to 5% by weight.

The present invention also relates to a process for producing the plastics products according to the invention, especially compounds and masterbatches, by kneading and extruding PVC with the pigment coated according to the invention.

PVC is used in accordance with the invention with different contents of plasticizers. PVC having a content of plasticizers of 0% to 12% is also called rigid PVC. PVC having a content of plasticizers of more than 12% is also called flexible PVC (Römpp Chemielexikon, Online Version 3.28, article last updated: December 2009, document identifier RD-16-03650).

The invention also relates to a plastics product comprising from 0% to 15% by weight, preferably from 0% to 12% by weight, of plasticizer, based on the amount of PVC present in the plastics product.

Suitable plasticizers are, for example, primary and secondary plasticizers and extenders. Primary plasticizers are, for example, phthalic esters, trimellitic esters, phosphates and polymer plasticizers. Secondary plasticizers are, for example, adipates, azelates, decanedioic esters and alkyl fatty acid esters. The group of the extenders includes, for example, aromatic hydrocarbons and chloroparaffins (from Online Version 3.2.8, article last updated: March 2006, document identifier. RD-23-00480).

The present invention also relates to a plastics product, for which the term "PVC dry-blend" is also used, comprising a mixture of pulverulent PVC, preferably rigid PVC, and coated pigment according to the invention. PVC dry-blends of this kind may additionally also comprise the additives required for the production of compounds (e.g. fillers, stabilizers, optionally further plasticizers, dyes, optionally further pigments). These may be present either in substance alongside the PVC or may already have been incorporated into the PVC of the dry-blend. Dry-blends are typically produced by intensive mixing of the above-described constituents thereof just below the melting point of the plastic. The dry-blends can be used to produce the products by the processing methods customary for PVC, such as extrusion, injection moulding, calendering or blow-moulding.

The present invention also relates to a product, for which the terms "moulding" or "finished good" are also used synonymously in the context of this invention, comprising at least one plastics products according to the invention. Products of this kind are, for example, window profiles, pipes, floor coverings, insulation material or roofing membranes.

The present invention also relates to a process for producing the coated pigments according to the invention. Coating can be accomplished by any processes which lead to coating of the compounds mentioned onto inorganic pigments. These include application by grinding, precipitation or spraying of the compounds with which the inorganic pigment is to be coated, either in solid form or in suspension form.

The preferred process according to the invention comprises at least the steps of:

a) providing an aqueous suspension of at least one inorganic pigment from the group of iron oxides, iron oxide hydroxides, zinc ferrites, magnesium ferrites and/or manganese ferrites,
b) precipitating the coating of hydroxides and/or oxides of magnesium and/or calcium onto the inorganic pigment by adding magnesium and/or calcium salts, preferably in dissolved form, to the suspension from step a) and then adding a precipitant from the group of alkali metal hydroxides, alkaline earth metal hydroxides, or ammonia, preferably in dissolved form, to the suspension or
b') precipitating the coating of hydroxides and/or oxides of magnesium and/or calcium onto the inorganic pigment by adding a precipitant from the group of alkali metal hydroxides, alkaline earth metal hydroxides, or ammonia, preferably in dissolved form, to the suspension from step a) and then adding magnesium and/or calcium salts, preferably in dissolved form, to the suspension,
to obtain the coated pigment.

The preferred process for producing coated pigment according to the invention optionally additionally comprises one, two, three or four of the steps of i) isolating the coated pigment, ii) washing the coated pigment, iii) drying the coated pigment, and iv) comminuting the coated pigment, preferably in the sequence specified.

The pigments used in step a) of the preferred process are pulverulent pigments or pastes made from pigments which originate directly from the pigment production operation. Pastes are free-flowing, pigment-containing, aqueous suspensions.

In a further variant (step b"), the addition of the precipitant from the group of alkali metal hydroxides, alkaline earth metal hydroxides or ammonia, preferably in dissolved form, and of the magnesium and/or calcium salts, preferably in dissolved form, to an initial charge of pigment suspension can also be effected simultaneously. The alternative steps b), b') or b") result in coating of the inorganic pigment with hydroxides and/or oxides of magnesium and/or calcium.

The precipitants particularly preferred in the process according to the invention are sodium hydroxide and/or potassium hydroxide.

In the variants according to steps b), b') or b"), preference is given to using magnesium and/or calcium salts, more preferably aqueous solutions thereof, most preferably magnesium sulphate, magnesium chloride, magnesium nitrate, calcium chloride and/or calcium nitrate.

During the precipitative application of the coating composed of hydroxides and/or oxides of magnesium and/or calcium to the inorganic pigment and optionally during the further reaction, preferably a temperature of 10 to 99° C., more preferably of 20 to 85° C. and most preferably of 20 to 70° C. is chosen.

The time during which either the precipitant or the magnesium and/or calcium salts are added to the reaction mixture may vary within wide ranges.

Preference is given to mixing the reaction components in steps b), b') or b"), particularly by means of static or dynamic mixers. For this purpose, for example, stirrers, propellers, paddles and/or pumps are used.

The reaction mixture from steps b), b') or b"), after the components have been added, is optionally mixed further, in order to allow the precipitative application of the hydroxides and/or oxides of magnesium and/or calcium to the inorganic pigment to proceed with maximum completeness. The time for the further reaction depends on the size of the reaction mixture. To check the completeness of the reaction, samples can be taken at time intervals, which are analysed for the magnesium and/or calcium content. If the expected magnesium and/or calcium content is attained, the reaction is ended.

After the reaction has ended, the coated inorganic pigment according to the invention is optionally separated from the reaction mixture by customary methods, for example filtering or centrifuging. The solids removed are then optionally washed with water, preferably with demineralized water, preferably until the filtrate only has a conductivity of less than or equal to 1000 µS/m, preferably of less than or equal to 500 µS/m.

In processes for producing pigments, calcination steps are used in some cases. Calcination is understood to mean a thermal treatment of a solid or semi-moist pigment at temperatures of greater than 600° C. This may be necessary when pigments are to be dewatered or converted to other polymorphs. In the process according to the invention, no calcination step is required. In a preferred embodiment of the process according to the invention, therefore, a calcination step is ruled out. In a particularly preferred embodiment of the process according to the invention, therefore, a calcination step at temperatures of greater than 600° C. is ruled out.

The coated pigments according to the invention are an improvement of the prior art, since plastics products and products made from PVC which have been coloured with the coated pigments according to the invention have a high thermal stability and UV stability.

EXAMPLES AND METHODS

I. Description of the Measurement and Test Methods Used

The results of the measurements for the examples are summarized in Table 1.

I.1 Zeta Potential (Isoelectric Point, IEP)

The zeta potential was determined to ISO 13099-2 on a "Zetasizer Nano Z" from Malvern Instruments GmbH (having a 633 nm He—Ne laser).

I.2 DIN pH

The DIN pH of pigments was measured to DIN ISO 787-9.

I.3 Mg and Ca Determination

The magnesium and calcium content of the pigments was measured via optical emission spectrometry after excitation in an inductively coupled plasma (ICP-OES: inductively coupled plasma-optical emission spectrometry) as the content of elements.

I.4 Specific BET Surface Area

The specific BET surface area was measured to DIN ISO 9277.

I.5 Testing of PVC Stability by Means of a Mathis LTE-T Oven from Werner Mathis AG (Mathis Oven Stability)

The test strips required for the testing are produced on a mixing roll mill (Servitec Polymix 150L). For this purpose, 50 g of rigid PVC compound (SorVyl DB 6668 Natur 3/03 PVC Compound from Polymer-Chemic GmbH) and 2 g of the pigment to be tested (4% by weight) are weighed in a polyethylene cup and mixed intimately with a spatula. The mixture is applied to the mixing roll mill and rolled at 175° C. and a friction of 1:1.2 to give a milled sheet of thickness 200 µm. With constant turning, the pigment is dispersed for 10 min.

The milled sheet thus produced is removed from the roller. A guillotine is used to prepare the strips of length 50 cm and width 2 cm required for the subsequent test in the Mathis oven, and they are clamped in the material carriers of the Mathis oven.

In the Mathis oven thermal test (LTE-T thermal tester, test cabinet for testing the thermal stability of plastics from Werner Mathis AG. Oberhasli, Zurich, Switzerland), PVC samples are exposed to thermal stress for different periods of time, defined by the discrete advance of a sledge out of the oven. The temperature during the test is 190° C. The material carrier containing the PVC test specimens is moved 75 mm further out of the oven every 5 minutes (oven setting: interval 5 minutes, advance 75 mm), with rapid cooling of the part moved out of the oven to room temperature. As a result, there are directly successive zones each of length 75 mm in the test specimen, each of which has been subjected to thermal stress for 5 minutes longer than the previous zone. The PVC breakdown sets in at different times for different pigments, and causes the test strip to become darker to black from a particular zone. To assess the pigment suitability in terms of the stabilization of PVC, two times are reported in each case, e.g. 35/45, these values stating the number of minutes (min.). The first time, 35 min. in this example, is the residence time in minutes for the corresponding test specimen zone in the Mathis oven where there is still no visible discolouration of the corresponding test specimen zone. The second time, 45 min. in this example, is the residence time in minutes for the corresponding test specimen zone in the Mathis oven where the discolouration of the corresponding test specimen zone is at its maximum for the first time. In general, the corresponding test specimen zones have turned black after the maximum discolouration.

I.6 Testing of PVC Stability by Means of Thermo Haske Rheomix 600p Kneader (Kneader Stability)

A pulverulent PVC mixture consisting of 50% by weight of Vestolit B 7021 Ultra+50% by weight of SorVyl DB 6668 Natur 3/03 is mixed homogeneously with the pulverulent pigment sample to be tested (4% by weight based on 100% PVC composition).

The pigmented PVC mixture is introduced manually into the recording kneader (Thermo Haake Rheomix 600p with R6 roll rotors) which has been preheated to 190° C. and is equipped with a rotary rheometer. The recording program (PolyLab Monitor) is started and records the torque on the roll rotors and the temperature of the sample against time. The pigmented PVC mixture is kneaded at 190° C. and 50 rpm. In order to determine the suitability of the pigment with regard to the stabilization of PVC, the maximum torque on the time axis in minutes at which the highest product temperature was measured is reported. After this maximum torque, the torque declines significantly, since the PVC breaks down after this time and the viscosity of the kneaded product decreases as a result. These values are compared with the corresponding value for the same, albeit uncoated, pigment powder. The longer the period of time until said maximum, the higher the stability of the pigment-coloured PVC.

II: Examples

II.1 Properties of the Inorganic Pigments and Plastics Used

Bayferrox® 110 pigment powder from LANXESS Deutschland GmbH: haematite (red iron oxide, α-$Fe_2O_3$) having a BET surface area to DIN ISO 9277 of 13-16 $m^2$/g.

Bayferrox® 330 paste: magnetite (black iron(II,III) oxide, $Fe_3O_4$) in paste form from LANXESS Deutschland GmbH, from which Bayferrox® 330 powder is produced by drying and grinding. The pulverulent pigment has a BET surface area to DIN ISO 9277 of 9-17 $m^2$/g. Alternatively, it is also possible to mix the pulverulent Bayferrox® 330 pigment with water to give a slurry having the appropriate pigment concentration.

Bayferrox® 420 paste: goethite (yellow iron oxide hydroxide, α-FeOOH) in paste form from LANXESS Deutschland GmbH, from which Bayferrox® 420 powder is produced by drying and grinding. The pulverulent pigment has a BET surface area to DIN ISO 9277 of 11-15 $m^2$/g. Alternatively, it is also possible to mix the pulverulent Bayferrox® 420 pigment with water to give a slurry having the appropriate pigment concentration (see examples).

Bayferrox® 920 paste: goethite, α-FeOOH paste from LANXESS Deutschland GmbH, from which Bayferrox® 920 powder is produced by drying and grinding. The pulverulent pigment has a BET surface area to DIN ISO 9277 of 11-15 $m^2$/g. Alternatively, it is also possible to mix the pulverulent Bayferrox® 920 pigment with water to give a slurry having the appropriate pigment concentration (see examples).

Bayferrox® 943 paste: lepidocrocite (iron oxide hydroxide, γ-FeOOH) in paste form from LANXESS Deutschland GmbH, from which Bayferrox® 943 powder is produced by drying and grinding. The pulverulent pigment has a BET surface area to DIN ISO 9277 of 16-19 $m^2$/g. Alternatively, it is also possible to mix the pulverulent Bayferrox® 943 pigment with water to give a slurry having the appropriate pigment concentration.

Bayrerrox® 3950 pigment powder from LANXESS Deutschland GmbH: zinc ferrite ($ZnFe_2O_4$) having a BET surface area to DIN ISO 9277 of 5-7 $m^2$/g.

Bayferrox® 645T pigment powder from LANXESS Deutschland GmbH: non-stoichiometric manganese ferrite (having MnO content <9% by weight) having a BET surface area to DIN ISO 9277 of 8-13 $m^2$/g.

SorVyl DB 6668 Natur 3/03: Rigid PVC compound from Polymerchemie (powder form, stabilized with Ca/Zn, where the content of bis(pentane-2,4-dionato)calcium is less than 1% by weight, with softening point >120° C., flashpoint >190° C., ignition temperature >300° C., density to DIN EN ISO 1183-1 method A, of 1.39 g/$cm^3$, bulk density to DIN EN ISO 60 of 0.54 g/ml, thermal stability to DIN EN 60811-3-2 of greater than/equal to 25 min.).

VESTOLIT® B 7021 Ultra: Mikro-S-PVC homopolymer from Vestolit (powder form, K value to DIN EN ISO 1628-2 of 70, viscosity number to DIN EN ISO 1628-2 of 125 $cm^3$/g, bulk density to DIN EN ISO 60 of 0.3 g/$cm^3$, sieve analysis—residue on 0.063 mm sieve to DIN EN ISO 1624 of <1%, water content according to K. Fischer DIN 53 715 of ≤0.3%, pH of the aqueous extract to DIN EN ISO 1264 of 8, 1.5/s paste viscosity of 1.8 Pa s, 451s paste viscosity of 2.2 Pa s).

II.2 Inventive Examples and Comparative Examples

Example 1

To 5 $dm^3$ of aqueous suspension of Bayferrox® 110 (9.39 mol of α-$Fe_2O_3$) having a pH of about 4.5 were added, at room temperature while stirring, 574 ml of an $MgSO_4$ solution (2.02 mol/$dm^3$). Subsequently, 0.25 mol of NaOH per mole of α-$Fe_2O_3$ was added dropwise as a solution while stirring within 30 min. (310 ml with concentration 7.65 mol/$dm^3$). The suspension was stirred for a further 60 min. The pH of the suspension was ≥12.

Example 2

To 5 $dm^3$ of aqueous suspension of Bayferrox® 110 (9.39 mol of α-$Fe_2O_3$) having a pH of about 4.5 were added, at room temperature while stirring, 1148 ml of an $MgSO_4$ solution (2.02 mol/dm$^3$ as MgO). Subsequently, 0.51 mol of NaOH per mole of $\alpha$-$Fe_2O_3$ was added dropwise while stirring within 60 min. (625 ml with concentration 7.65 mol/dm$^3$). The suspension was stirred for a further 60 min. The pH of the suspension was ≥12.

Example 3

To 5 dm$^3$ of aqueous suspension of Bayferrox® 110 (9.39 mol of $\alpha$-$Fe_2O_3$) having a pH of about 4.5 were added, at room temperature while stirring, 162 ml of an $MgSO_4$ solution (2.02 mol/dm$^3$ as MgO). Subsequently, 0.068 mol of NaOH per mole of $\alpha$-$Fe_2O_3$ was added dropwise while stirring within 30 min. (84 ml with concentration 7.65 mol/dm$^3$). The suspension was stirred for a further 60 min. The pH of the suspension was ≥12.

Example 4

To 2.13 dm$^3$ of aqueous suspension of Bayferrox® 110 (4.01 mol of $\alpha$-$Fe_2O_3$) having a pH of about 4.5 were added, at room temperature while stirring, 5517 ml of an $MgSO_4$ solution (1.15 mol/dm$^3$ as MgO). Subsequently, 3.18 mol of NaOH per mole of $\alpha$-$Fe_2O_3$ were added dropwise while stirring within 60 min. (with the aid of 7.65 mol/dm$^3$ solution). The suspension was stirred for a further 60 min. The pH of the suspension was ≥12.

Example 5

Comparative Example

To 5 dm$^3$ of aqueous suspension of Bayferrox® 110 (9.39 mol of $\alpha$-$Fe_2O_3$) having a pH of about 4.5 was added dropwise NaOH solution (0.06 mol, 7.65 mol/dm) while stirring within 30 min. The suspension was stirred for a further 60 min. The pH of the suspension was about 10.

Example 6

Comparative Example

To 5 dm$^3$ of aqueous suspension of Bayferrox® 110 (9.39 mol of $\alpha$-$Fe_2O_3$) having a pH of about 4.5 was added dropwise NaOH solution (0.18 mol, 7.65 mol/dm$^3$) while stirring within 30 min. The suspension was stirred for a further 60 min. The pH of the suspension was ≥12.

The products from Examples 1 to 6, after the reaction had ended, were filtered through a suction filter, washed until the conductivity of the filtrate was below 300 ρS/cm, dried to constant weight in a drying cabinet at 180° C. and ground in a Bauermeister mill (cross-beater mill with a sieve insert, mesh size 1 mm).

Example 7

To 7.7 kg of Bayferrox® 420 paste having pigment content 19.4% by weight and having a pH of 6-7 were added, at 60° C. while stirring, 1.12 mol of MgO from an $MgSO_3$ solution (1.15 mol/dm$^3$ as MgO). Subsequently, NaOH solution (7.7 mol/dm$^3$) was added dropwise while stirring within 15 min., until the pH had reached about 10.

Example 8

To 7.7 kg of Bayferrox® 420 paste having pigment content 19.4% by weight and having a pH of 6-7 were added, at 60° C. while stirring, 2.24 mol of MgO from an $MgSO_4$ solution (1.15 mol/dm$^3$ as MgO). Subsequently, NaOH solution (7.7 mol/dm$^3$) was added dropwise while stirring within 15 min., until the pH had reached about 10.

The products from Examples 7 and 8, after the reaction had ended, were filtered through a suction filter, washed until the conductivity of the filtrate was below 300 μS/cm, dried to constant weight in a drying cabinet at 120° C. and ground in a Bauermeister mill (cross-beater mill with a sieve insert, mesh size 1 mm).

Example 9

To 3.29 kg of Bayferrox® 920 paste having 130.8 g/dm$^3$ of pigment and having a pH of 5-6 were added, at 50° C. while stirring, 1.65 mol of NaOH as a solution (7.87 mol/dm$^3$). Subsequently, 0.82 mol of Mg from an $MgSO_4$ solution (2.05 mol/dm$^3$ as MgO) was added dropwise over the course of 15 min. The pH of the suspension was about 10.

Example 10

To 3.29 kg of Bayferrox® 920 paste having 130.8 g/dm$^3$ of pigment and having a pH of 5-6 was added, at 50° C. while stirring, 0.82 mol of Mg from an $MgSO_4$ solution (2.05 mol/dm$^3$ as MgO). Subsequently, 1.65 mol of NaOH (7.87 mol/dm$^3$) were added dropwise while stirring. The pH of the suspension was about 10.

The products from Examples 9 and 10, after the reaction had ended, were filtered through a suction filter, washed until the conductivity of the filtrate was below 500 μS/cm, dried to constant weight in a drying cabinet at 80° C. and ground in a cross-beater mill.

The properties of products 1 to 10 can be found in Tables 1 and 2. Examples 1 to 10 have a calcium content of 0.001% to 0.05% by weight, based on the total weight of the pigment.

Example 11

To 4.7 dm$^3$ of aqueous suspension of Bayferrox® 330 paste (6.48 mol of $Fe_3O_4$) having a pH of 5.8 were added, at 60° C. while stirring, 866 ml of an $MgSO_4$ solution (2.58 mol/dm).

Subsequently, 0.86 mol of NaOH per mole of $Fe_3O_4$ was added dropwise as a solution while stirring within 15 min. (379 g with concentration 7.9 mol/dm$^3$). The suspension was stirred for a further 60 min. The pH of the suspension was ≥11.

Example 12

To 2.85 dm$^3$ of aqueous suspension of Bayferrox® 330 paste (3.24 mol of $Fe_3O_4$) having a pH of 5.8 were added, at 60° C. while stirring, 2856 ml of an $MgSO_4$ solution (2.58 mol/din). Subsequently, 5.74 mol of NaOH per mole of $Fe_3O_4$ were added dropwise as a solution while stirring within 15 min. (3000 g with concentration 7.9 mol/dm$^3$). The suspension was stirred for a further 60 min. The pH of the suspension was ≥11.

The products from Examples 11 to 12, after the reaction had ended, were filtered through a suction filter, washed until the conductivity of the filtrate was below 300 μS/cm, dried to constant weight in a drying cabinet at 95° C. and ground in a Bauermeister mill (cross-beater mill with a sieve insert, mesh size 1 mm).

Example 13

To 5 dm³ of aqueous suspension of Bayferrox® 3950 (6.22 mol of $ZnFe_2O_4$) having a pH of about 7 were added, at 60° C. while stirring, 1442 ml of an $MgSO_4$ solution (2.58 mol/din).

Subsequently, 1.5 mol of NaOH per mole of $ZnFe_2O_4$ were added dropwise as a solution while stirring within 15 min. (1500 g with concentration 7.9 mol/dm³). The suspension was stirred for a further 60 min. The pH of the suspension was >11.

Example 14

To 2.5 dm³ of aqueous suspension of Bayferrox@3950 (3.11 mol of $ZnFe_2O_4$) having a pH of about 7 were added, at 60° C. while stirring, 1443 ml of an $MgSO_4$ solution (2.58 mol/dm³).

Subsequently, 3 mol of NaOH per mole of $ZnFe_2O_4$ were added dropwise as a solution while stirring within 15 min. (1500 g with concentration 7.9 mol/dm³). The suspension was stirred for a further 60 min. The pH of the suspension was >11.

The products from Examples 13 to 14, after the reaction had ended, were filtered through a suction filter, washed until the conductivity of the filtrate was below 300 μS/cm, dried to constant weight in a drying cabinet at 120° C. and ground in a Bauermeister mill (cross-beater mill with a sieve insert, mesh size 1 mm).

Example 15

To 5 dm³ of aqueous suspension of Bayferrox® 645T (1500 g) having a pH of about 6 were added, at 60° C. while stirring, 395 ml of an $MgSO_4$ solution (2.83 mol/dm³).

Subsequently, 2.24 mol of NaOH were added dropwise as a solution while stirring within 15 min. (362 g with concentration 7.9 mol/dm³). The suspension was stirred for a further 60 min. The pH of the suspension was >11.

Example 16

To 5 dm³ of aqueous suspension of Bayferrox® 645T (1500 g) having a pH of about 6 were added, at 60° C. while stirring, 1974 ml of an $MgSO_4$ solution (2.83 mol/dm³).

Subsequently, 13.95 mol of NaOH were added dropwise as a solution while stirring within 15 min. (2250 g with concentration 7.9 mol/dm³). The suspension was stirred for a further 60 min. The pH of the suspension was >11.

The products from Examples 15 to 16, after the reaction had ended, were filtered through a suction filter, washed until the conductivity of the filtrate was below 300 μS/cm, dried to constant weight in a drying cabinet at 120° C. and ground in a Bauermeister mill (cross-beater mill with a sieve insert, mesh size 1 mm).

Example 17

To 8.01 dm³ of aqueous suspension of Bayferrox® 943 paste (16.88 mol of FeOOH) having a pH of about 6 were added, at room temperature while stirring, 900 ml of an $MgSO_4$ solution (2.48 mol/dm³).

Subsequently, 0.26 mol of NaOH per mole of FeOOH was added dropwise as a solution while stirring within 15 min. (724 g with concentration 7.9 mol/dm³). The suspension was stirred for a further 60 min. The pH of the suspension was >11.

Example 18

To 8.01 dm³ of aqueous suspension of Bayferrox® 943 paste (16.88 mol of FeOOH) having a pH of about 6 were added, at room temperature while stirring, 5455 ml of an $MgSO_4$ solution (2.73 mol/dm³).

Subsequently, 1.76 mol of NaOH per mole of FeOOH were added dropwise as a solution while stirring within 15 min. (4800 g with concentration 7.9 mol/dm³). The suspension was stirred for a further 60 min. The pH of the suspension was >13.

The products from Examples 17 to 18, after the reaction had ended, were filtered through a suction filter, washed until the conductivity of the filtrate was below 300 μS/cm, dried to constant weight in a drying cabinet at 120° C. and ground in a Bauermeister mill (cross-beater mill with a sieve insert, mesh size 1 mm).

Example 19

To 3.3 dm³ of aqueous suspension of Bayferrox® 110 (6.26 mol of $Fe_2O_3$) having a pH of about 4.5 were added, at 60° C. while stirring, 6476 ml of an $MgSO_4$ solution (2.6 mol/dm³).

Subsequently, 5.39 mol of NaOH per mole of $Fe_2O_3$ were added dropwise as a solution while stirring within 15 min. (5440 g with concentration 7.9 mol/dm³). The suspension was stirred for a further 60 min. The pH of the suspension was >13.

The product from Example 19, after the reaction had ended, was filtered through a suction filter, washed until the conductivity of the filtrate was below 300 μS/cm, dried to constant weight in a drying cabinet at 180° C. and ground in a Bauermeister mill (cross-beater mill with a sieve insert, mesh size 1 mm).

The properties of products 11 to 19 can be found in Table 2. Examples 11 to 19 have a calcium content of 0.001% to 0.1% by weight, based on the total weight of the pigment.

TABLE 1

| Example | Mg content (% by wt.) | IEP | DIN pH | BET surface area (m²/g) | Kneader stability (min.) | Mathis oven stability (min.) [c] |
|---|---|---|---|---|---|---|
| Bayferrox ® 110 [a] | 0.0055 | 2.8 | 5.3 | 14.8 | 12 | 40/50 |
| 1 | 1.6 | 3.0 | 9.9 | 30.9 | 14 | 50/>50 |
| 2 | 2.2 | 3.1 | 9.6 | 33.4 | 16 | 50/>50 |
| 3 | 0.3 | 3.6 | 9.2 | 19.1 | 13 | 40/50 |
| 4 | 16.9 | 4.3 | 10.2 | 86.3 | 17 | 50/>50 |
| 5 | not determined | 2.2 | 6.6 | 14.2 | 12 | 40/50 |
| 6 | not determined | 2.3 | 8.9 | 13.6 | 12 | 40/50 |
| Bayferrox ® 420 [b] | 0.0051 | 8.1 | 6.9 | 12.5 | 11 | 30/40 |
| 7 | 1.6 | 5.8 | 10.1 | 14.9 | 15 | 35/45 |

TABLE 1-continued

| Example | Mg content (% by wt.) | IEP | DIN pH | BET surface area ($m^2/g$) | Kneader stability (min.) | Mathis oven stability (min.) [c] |
|---|---|---|---|---|---|---|
| 8 | 2.9 | 5.9 | 10.1 | 16.8 | 16 | 35/45 |
| Bayferrox ® 920 [c] | 0.007 | 7.1 | 4.9 | 13.5 | 11 | 30/40 |
| 9 | 4.7 | 9.2 | 10.2 | 20.2 | 17 | 40/50 |
| 10 | 4.9 | 9.2 | 10.2 | 18.5 | 16 | 40/50 |

[a] uncoated pigment as direct comparison with Examples 1 to 6, calcium content: 0.0121% by weight
[b] uncoated pigment as direct comparison with Examples 7 to 8, calcium content: 0.0236% by weight
[c] uncoated pigment as direct comparison with Examples 9 to 10, calcium content: less than 0.0300% by weight
d): for evaluation see test methods

TABLE 2

| Example | Mg content (% by wt.) | IEP | DIN pH | BET surface area ($m^2/g$) | Kneader stability (min.) | Mathis oven stability (min.) [f] |
|---|---|---|---|---|---|---|
| Bayferrox ® 330 [a] | 0.2 | 5.4 | 8.8 | 15.9 | 12 | not determined |
| 11 | 3.3 | 6.5 | 10.1 | 28.4 | 16 | not determined |
| 12 | 16 | >9.8 | 10.2 | 84.1 | 18 | not determined |
| Bayferrox ® 3950 [b] | 0.01 | 6.1 | 8.0 | 5.4 | 12 | not determined |
| 13 | 5.8 | 8.3 | 10.4 | 24.1 | 18 | not determined |
| 14 | 9.0 | 9.2 | 10.4 | 28.1 | 19 | not determined |
| Bayferrox ® 645T [c] | 0.04 | 2.8 | 6.6 | 8.8 | 13 | not determined |
| 15 | 1.8 | 3.1 | 10.1 | 18.7 | 15 | not determined |
| 16 | 11.5 | 3.1 | 10.2 | 60.2 | 18 | not determined |
| Bayferrox ® 943 [d] | <0.01 | 8.6 | 4.1 | 17.2 | 12 | not determined |
| 17 | 3.9 | 8.6 | 10.1 | 23.3 | 15 | not determined |
| 18 | 17 | 10.7 | 10.1 | 49.2 | 16 | not determined |
| 19 [e] | 23 | 3.6 | 10.3 | 100.0 | 19 | 50/>50 |

[a] uncoated pigment as direct comparison with Examples 11 to 12, calcium content: less than 0.099% by weight
[b] uncoated pigment as direct comparison with Examples 13 to 14, calcium content: less than 0.0320% by weight
[c] uncoated pigment as direct comparison with Examples 15 to 16, calcium content: less than 0.0400% by weight
[d] uncoated pigment as direct comparison with Examples 17 to 18, calcium content: less than 0.0360% by weight
[e] for uncoated pigment as direct comparison see Bayferrox ® 110 from Examples 1-6
[f] for evaluation see test methods

What is claimed is:

1. A coated pigment comprising:
   inorganic pigment selected from the group consisting of iron oxides, iron oxide hydroxides, zinc ferrites, magnesium ferrites, manganese ferrites, and mixtures thereof; and
   at least one of hydroxides and oxides of at least one of magnesium and calcium bonded directly to the surface of the core of the inorganic pigment to form coated pigment;
   wherein, based on the total weight of the coated pigment, the coated pigment comprises:
   3.5% to 30% by weight of magnesium and 0.001% to 0.1% by weight of calcium, or
   5.5% to 30% by weight of calcium.

2. The coated pigment according to claim 1, wherein the coated pigment comprises:
   a core consisting of the inorganic pigment; and
   a coating surrounding at least a portion of the core and consisting of the hydroxides and/or oxides of magnesium and/or calcium.

3. The coated pigment according to claim 1, wherein the inorganic pigment is haematite, and the coated pigment has an isoelectric point of <7.

4. The coated pigment according to claim 1, wherein the inorganic pigment is selected from the group consisting of iron oxides, iron oxide hydroxides, zinc ferrites, magnesium ferrites, manganese ferrites, and mixtures thereof, excluding haematite, and the coated pigment has an isoelectric point of 2 to 12.

5. The coated pigment according to claim 1, wherein the coated pigment comprises 3.5% to 25% by weight of magnesium or 5.5% to 25% by weight of calcium, based on the total weight of the coated pigment.

6. The coated pigment according to claim 1, wherein the coated pigment comprises 3.5% to 25% by weight of magnesium based on the total weight of the coated pigment.

7. The coated pigment according to claim 1, wherein:
   the at least one of hydroxides and oxides of at least one of magnesium and calcium comprises hydroxides of at least one of magnesium and calcium, and the at least one of magnesium and calcium comprise 5% to 25% by weight of the coated pigment;
   the inorganic pigment forms a core of the coated pigment, the hydroxides and oxides define a surrounding layer around the core, and a surface of the core of the inorganic pigment is bonded directly to the surrounding layer; and
   wherein,
   when the inorganic pigment is haematite, the coated pigment has an isoelectric point of <6.8; or
   when the inorganic pigment is iron oxides other than haematite, iron oxide hydroxides, zinc ferrites, magnesium ferrites, manganese ferrites, or mixtures thereof, the coated pigment has an isoelectric point of 2 to 12.

8. The coated pigment according to claim 1, wherein the coated pigment comprises 5.5% to 25% by weight, of calcium, based on the total weight of the coated pigment.

9. A plastics product comprising at least one polymer and at least one coated pigment according to claim 1, wherein at least 50% by weight of the polymer is formed from monomer vinyl chloride.

10. The plastics product according to claim 9, wherein at least 80% by weight of the polymer is formed from the monomer vinyl chloride.

11. The plastics product according to claim 9, wherein the polymer is polyvinyl chloride.

12. The plastics product according to claim 11, wherein the polyvinyl chloride is pulverulent polyvinyl chloride.

13. The plastics product according to claim 11, wherein the polyvinyl chloride is rigid polyvinyl chloride.

14. The plastics product according to claim 9, comprising 10% to 90% by weight of the at least one coated pigment.

15. The plastics product according to claim 9, comprising 20% to 70% by weight of the at least one coated pigment.

16. The plastics product according to claim 9, comprising 0.1% to 10% by weight of the at least one coated pigment.

17. The plastics product according to claim 9, comprising 0.5% to 5% by weight of the at least one coated pigment.

18. The plastics product according to claim 9, comprising 0% to 15% by weight of plasticizer, based on the amount of vinyl chloride present in the plastics product.

19. The plastics product according to claim 9, comprising 0% to 12% by weight of plasticizer, based on the amount of vinyl chloride present in the plastics product.

20. A process for producing the coated pigment according to claim 1, the process comprising precipitating the coating onto the inorganic pigment by adding:
   at least one of magnesium salts and calcium salts; and
   a precipitant selected from the group of alkali metal hydroxides, alkaline earth metal hydroxides, and mixtures thereof,
   to an aqueous suspension of the at least one inorganic pigment.

21. The process for producing the coated pigment according to claim 20, wherein the process comprises one of:

a) precipitating the coating onto the inorganic pigment by adding the at least one of magnesium salts and calcium salts to the aqueous suspension of the at least one inorganic pigment, followed by adding the precipitant, or
   b) precipitating the coating onto the inorganic pigment by adding the precipitant to the aqueous suspension of the at least one inorganic pigment, followed by adding the at least one of magnesium salts and calcium salts to the suspension.

22. The process for producing coated pigment according to claim 20, wherein the at least one of magnesium salts and calcium salts, and the precipitant are added in dissolved form.

23. The process for producing coated pigment according to claim 20, additionally comprising one, two, three or four of the steps of:
   i) isolating the coated pigment,
   ii) washing the coated pigment,
   iii) drying the coated pigment, and
   iv) comminuting the coated pigment.

24. The process for producing coated pigment according to claim 20, wherein the process does not include a calcination step.

25. A process for producing the plastics products according to claim 11, the process comprising at least one of kneading or extruding the polyvinyl chloride with the at least one coated pigment.

26. A process for producing the plastics product according to claim 12, the process comprising mixing the at least one coated pigment and the pulverulent polyvinyl chloride at a temperature just below the melting point of the polyvinyl chloride.

27. A product comprising at least one plastics product according to claim 9.

28. The product according to claim 27, wherein the product is one of window profiles, pipes, floor coverings, insulation material or roofing membranes.

* * * * *